United States Patent [19]
Miller et al.

[11] Patent Number: 6,098,346
[45] Date of Patent: Aug. 8, 2000

[54] SLIDE OUT KITCHEN FOR MOTOR HOMES AND THE LIKE

[75] Inventors: William J. Miller, Wakarusa; Kenneth W. Nisley, Nappanee, both of Ind.

[73] Assignee: Newmar Corporation, Nappanee, Ind.

[21] Appl. No.: 08/980,639

[22] Filed: Dec. 1, 1997

[51] Int. Cl.[7] .................................................. E04B 1/343
[52] U.S. Cl. ............................. 52/67; 52/79.1; 52/143; 296/22; 296/24.1; 296/26; 296/171
[58] Field of Search ............................... 52/67, 79.1, 143; 296/22, 24.1, 26, 171, 175, 156; 285/272, 275, 282

[56] References Cited

U.S. PATENT DOCUMENTS

| | | | |
|---|---|---|---|
| 2,757,418 | 8/1956 | Bergstrom . | |
| 3,200,545 | 8/1965 | Bunge . | |
| 4,077,568 | 3/1978 | May | 52/67 |
| 4,133,571 | 1/1979 | Fillios | 52/67 |
| 4,270,319 | 6/1981 | Spasojevic | 52/36 |
| 4,791,961 | 12/1988 | Nitzberg et al. | 137/614.04 |
| 5,063,968 | 11/1991 | Bartholomew | 138/109 |
| 5,224,305 | 7/1993 | Kassai | 52/34 |
| 5,285,604 | 2/1994 | Carlin | 52/79.1 |
| 5,582,437 | 12/1996 | Bartholomew | 285/272 |
| 5,720,501 | 2/1998 | Ortloff et al. | 285/93 |
| 5,800,002 | 9/1998 | Tiedge | 296/26 |
| 5,833,295 | 11/1998 | Farlow, Jr. | 296/24.1 |

*Primary Examiner*—Carl D. Friedman
*Assistant Examiner*—Yvonne M. Horton
*Attorney, Agent, or Firm*—Ryan M. Fountain

[57] ABSTRACT

A plumbing assembly is provided which is formed from a plurality of rigid pipe sections, connected between a movable sink and a relatively fixed fluid outlet. These pipe sections are joined together by swivel fittings that permit the pipe sections to rotate with respect to each other. In this manner, different distances between the sink and the fluid outlet are accommodated by a folding and unfolding motion of the plumbing assembly in a minimum of space behind the wall of an expandable portion of the room. Fluid supply lines for providing hot and cold water to the sink faucet can be mounted within the same spacial area by means of similar swivel fittings that create an offset parallelogram structure. The lengths of at least the fluid draining pipe sections and the supporting structure behind the wall are selected such that a downward slope is maintained over the entire fluid flow path between the sink and the fluid outlet regardless of sink position during usage.

9 Claims, 11 Drawing Sheets

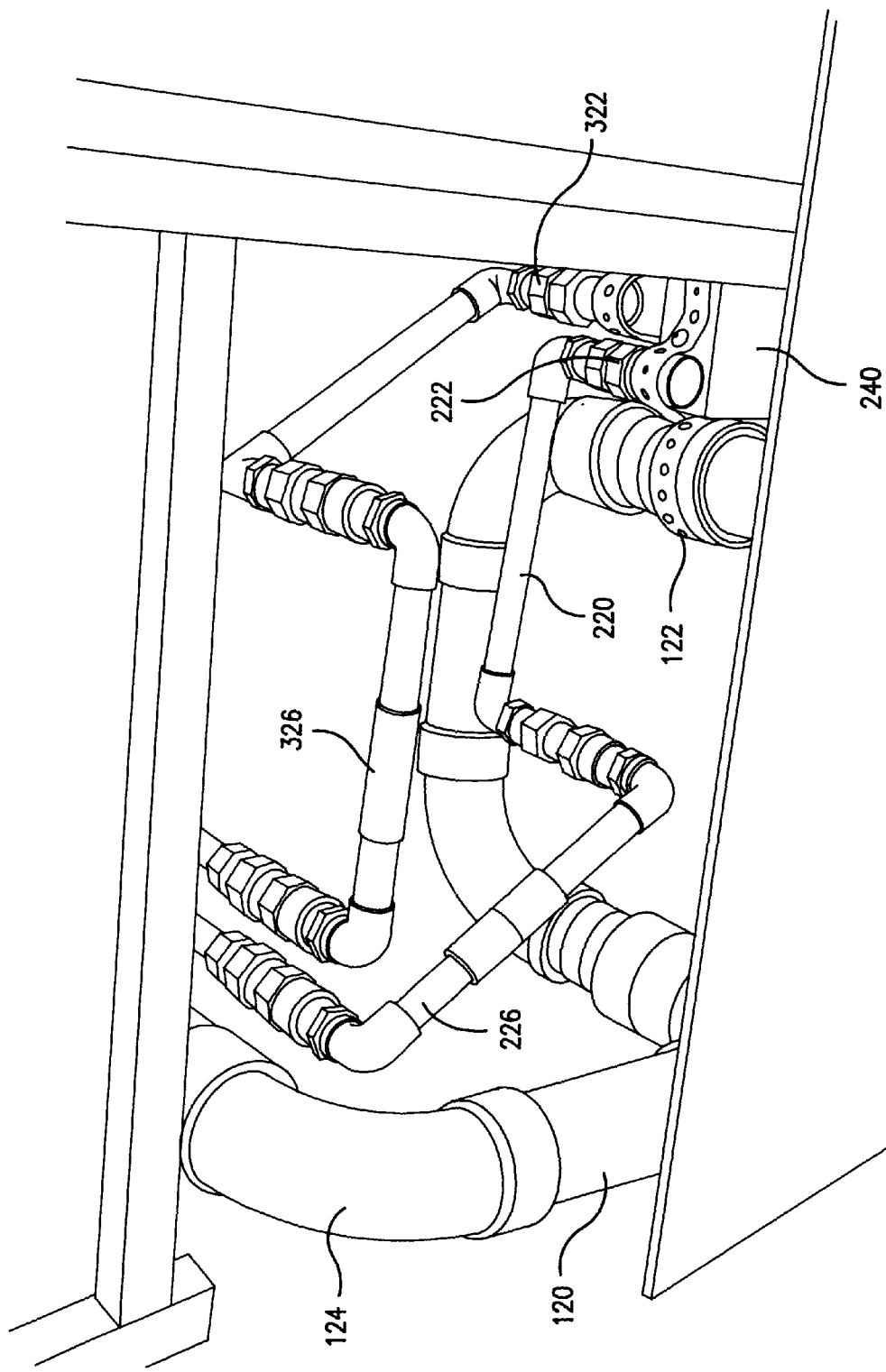

SLIDE OUT KITCHEN FOR MOTOR HOMES AND THE LIKE

BACKGROUND AND SUMMARY OF THE INVENTION

The present invention relates generally to expandable rooms for habitable accommodations in static structures and vehicles. More particularly, this invention relates to room structures that are telescopically slidable between retracted and expanded positions and which provide plumbing fixtures, such as kitchen sinks, in those rooms.

Various motorized and towable vehicles are known which have rooms or portions thereof that can be adjusted between expanded and retracted positions in order to provide more or less internal accommodation, respectively, as desired by the user. In a typical structure, one portion of the room is movable and telescopically received or nested within a portion of the room that remains fixed. Similar structures can be used effectively in buildings, although for convenience the discussion below focusses primarily on the vehicular examples.

When the vehicle, a Class A motor home for example, is in motion, the room typically remains in a retracted position. As such, there is adequate space within the room to accommodate users in transit and remain within the standard width limitations imposed upon motor vehicles. When the motor home is stopped for a length of time, however, it is often desirable to increase the size of internal accommodations. At that point users can slide the nested room portion out to its fully expanded position. An example of such rooms is shown in U.S. Pat. No. 5,491,933.

Previously, expandable rooms have been used for living rooms and the like where furniture is displaced in the expansion of the room. However, difficulties can be encountered when the expandable portion of the room incorporates plumbing fixtures, such as a kitchen sink, due to the impact of room expansion upon the plumbing. Traditionally, plumbing to supply hot and cold water in to a sink and remove waste fluid out from the sink has been provided by rigid pipes fixedly connected together and mounted behind walls. When walls and/or floors move relative to each other, as in an expandable room, such prior arrangements cannot be maintained.

The fluid inlet lines for hot and cold water and fluid outlet lines for waste water are typically fixed with respect to the vehicle. It has been suggested to employ flexible hoses coupled between those fixed lines. However, such arrangements have been found to have at least drainage difficulty because the flexible lines may not maintain a downward or negative slope from the sink to the drain over the entire length of the lines when the sink is moved between positions. As a result, fluid may become trapped within the flexible lines, leading to an unsanitary environment. Also, flexible lines have a greater tendency to bind and/or leak over time, especially as a result of the stresses imposed by repeated sink movement and vehicular vibration. Where such plumbing is placed behind the wall in a vehicle, detection, maintenance and repair to overcome these deficiencies becomes more difficult. On the other hand, if such plumbing is exposed within the vehicle, it becomes unsightly, permits leakage to contact living spaces and furniture and can present an unwanted or hazardous obstruction to user traffic within the vehicle. Moreover, any such plumbing arrangement within a vehicle must withstand the vibrational stresses imposed by vehicular motion without loss of sealing integrity and should consume a minimum of vehicular interior space.

Accordingly, it is an object of this invention to provide an improved plumbing assembly particularly suited for use with expandable room structures. Further objects include the provision of a plumbing assembly for expandable rooms that:

A. is reliable over long periods of time in a vehicular environment;

B. maintains proper fluid flow regardless of room position;

C. is inexpensive to manufacture and assemble; and

D. is compact and requires a minimum of space in behind the wall construction.

These and other objects of the present invention are obtained through the provision of a plumbing assembly formed from a plurality of rigid pipe sections, connected between a movable sink and a relatively fixed fluid outlet, which are joined together by swivel fittings that permit the pipe sections to rotate with respect to each other. In this manner, different distances between the sink and the fluid outlet are accommodated by a folding and unfolding motion of the plumbing assembly in a minimum of space behind the wall of an expandable portion of the room. Fluid supply lines for providing hot and cold water to the sink faucet can be mounted within the same spacial area by means of similar swivel fittings that create an offset parallelogram structure. The lengths of at least the fluid draining pipe sections and the supporting structure behind the wall are selected such that a downward slope is maintained over the entire fluid flow path between the sink and the fluid outlet regardless of sink position during usage.

Other objects, advantages and novel features of the present invention will be readily apparent to those skilled in the art from the following drawings and detailed description of preferred embodiments.

BRIEF DESCRIPTION OF THE DRAWINGS

FIG. 6C shows an upper cutaway left side perspective view of the fluid pipes of the slide out kitchen of FIG. 1 when completely extended from the vehicle.

DESCRIPTION OF PREFERRED EMBODIMENTS

Figure 1:
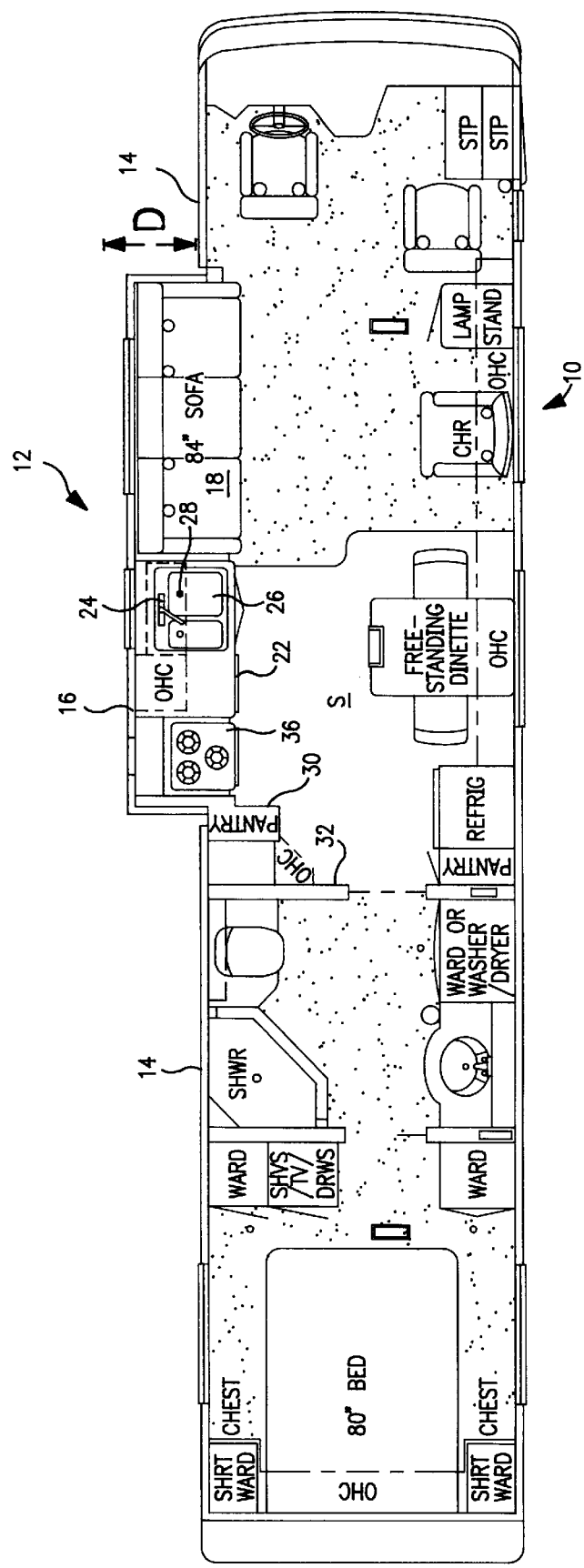
FIG. 1 shows a floorplan view of a motor home having a slide out kitchen incorporating the present invention, the slide out kitchen being in an extended position.
Figure 2:
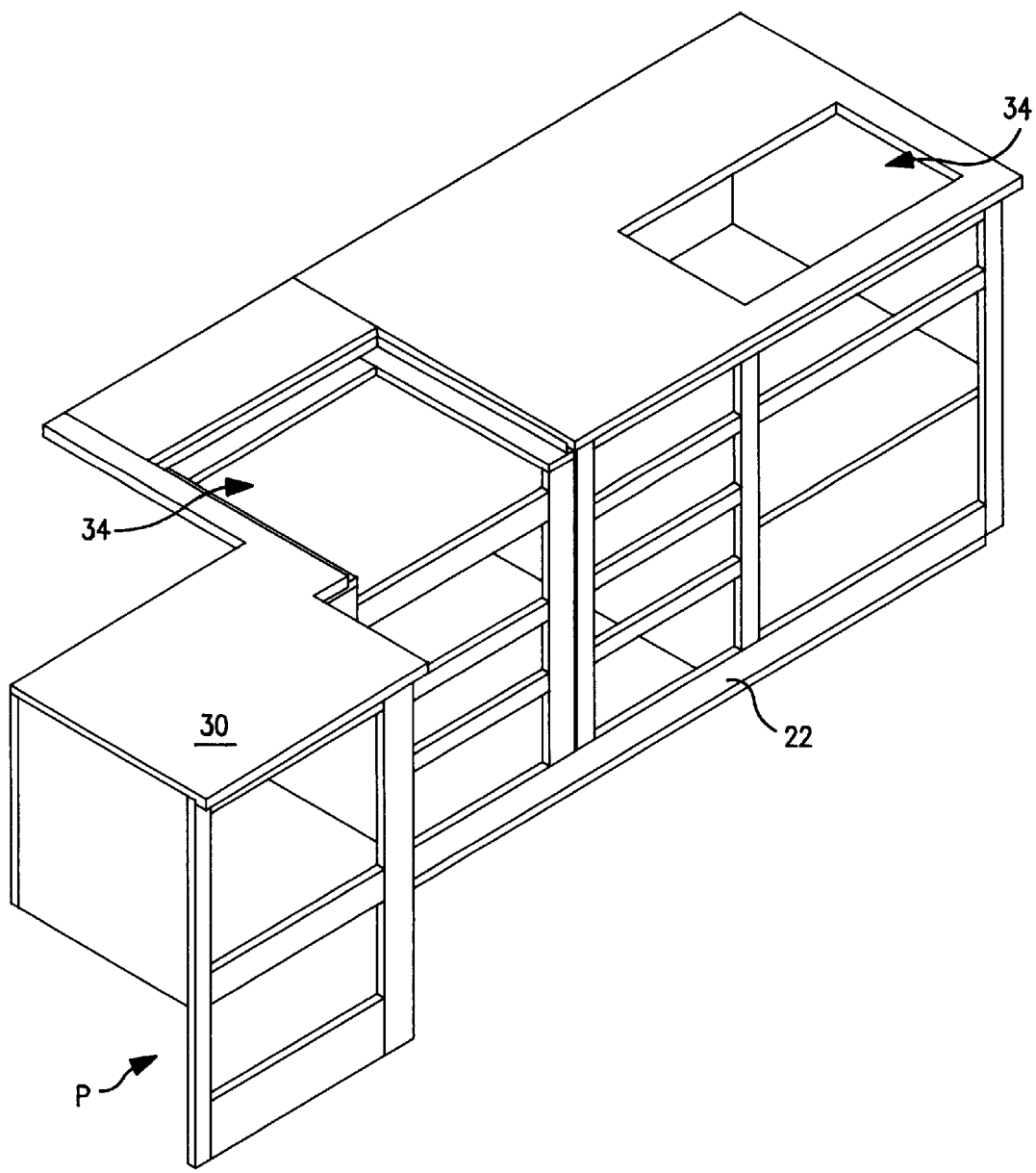
FIG. 2 shows a front, upper left side perspective view of covering cabinetry of the slide out kitchen of FIG. 1.
Figure 3A:
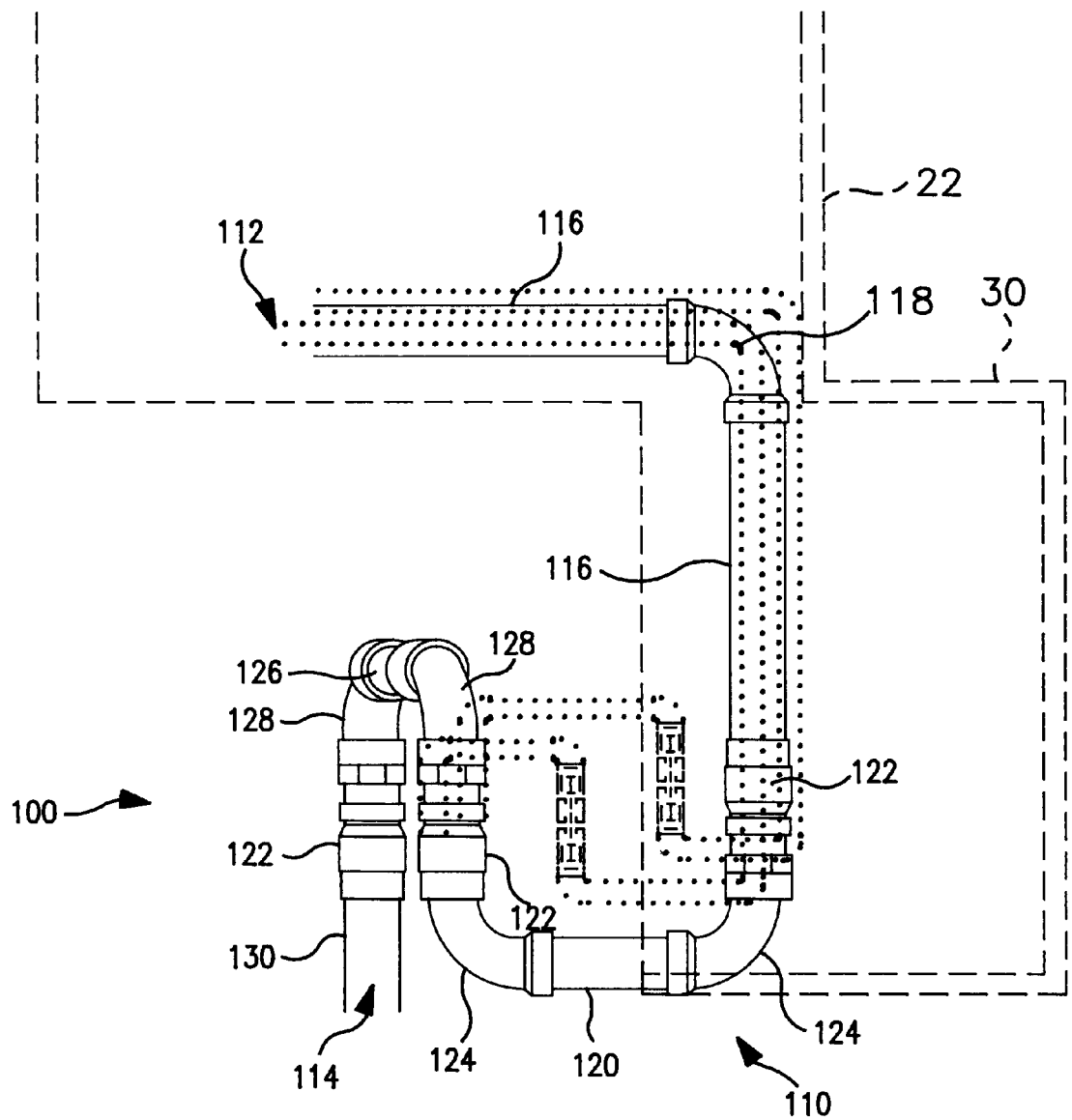
FIG. 3A shows a top schematic view of the drain pipes of the slide out kitchen of FIG. 1 when fully retracted within the vehicle, other fluid pipes and the covering cabinetry being shown in phantom.
Figure 3B:
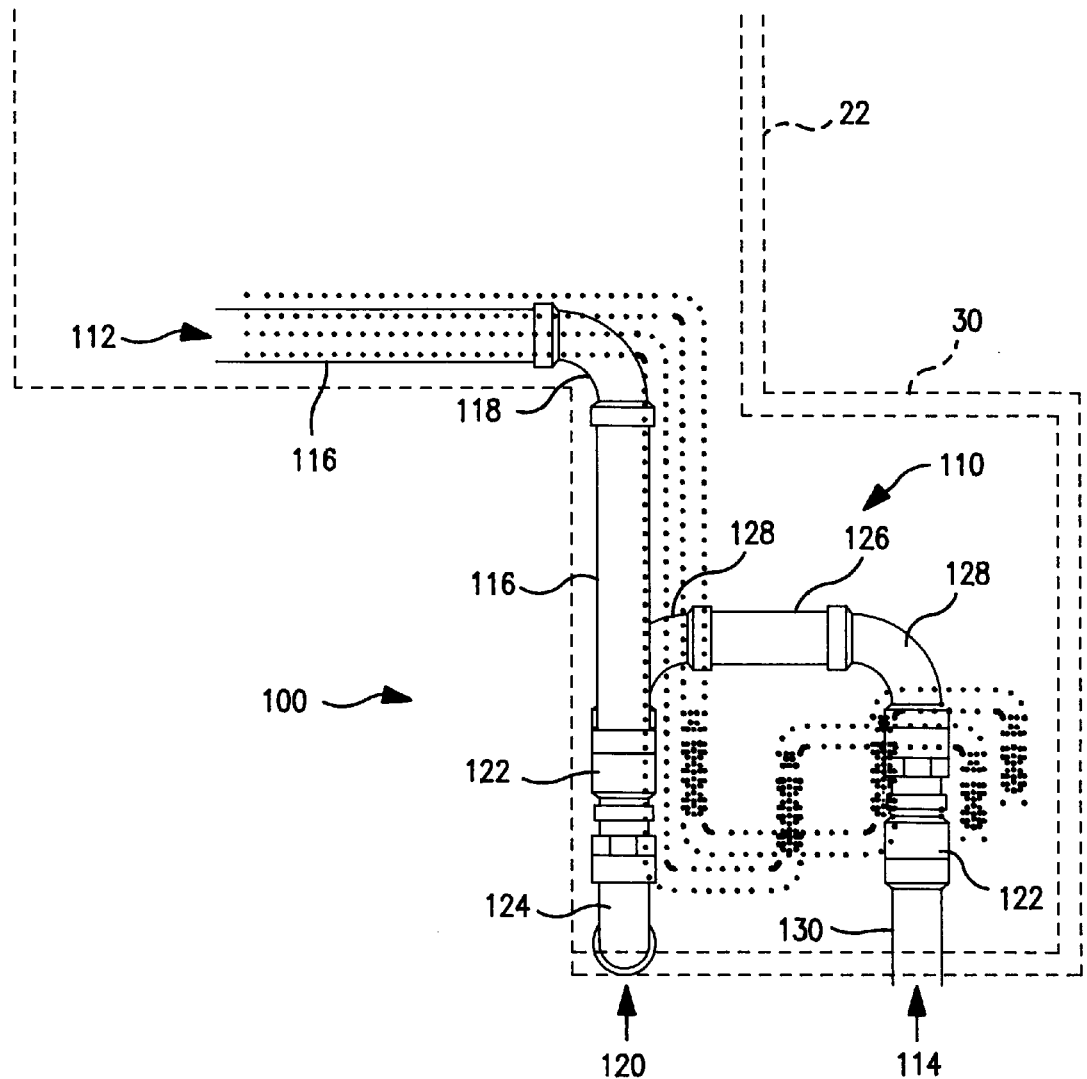
FIG. 3B shows a top schematic view of the drain pipes of the slide out kitchen of FIG. 1 when completely extended from the vehicle, other drain pipes and the covering cabinetry being shown in phantom.
Figure 4A:
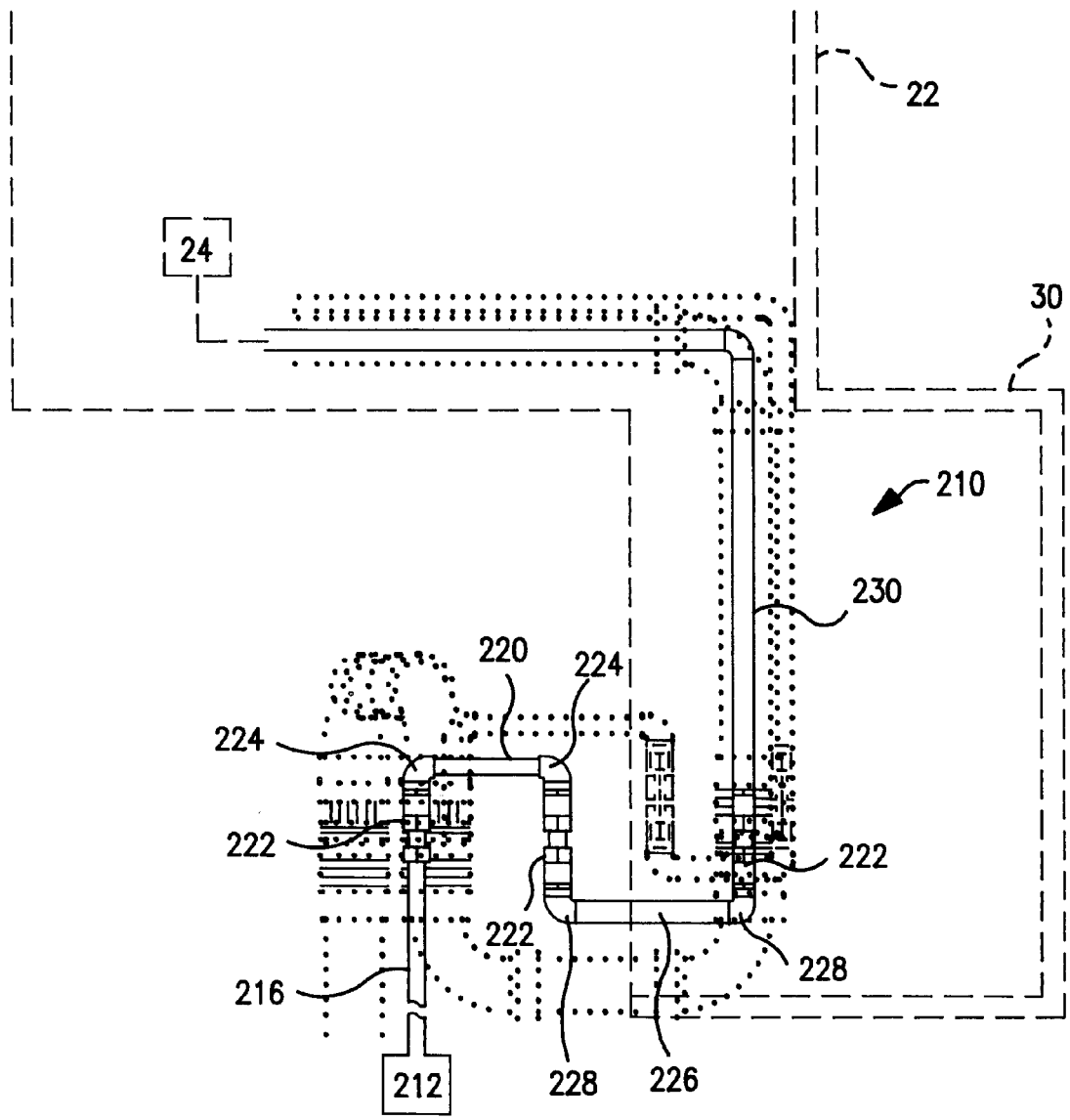
FIG. 4A shows a top schematic view of the hot water pipes of the slide out kitchen of FIG. 1 when fully retracted within the vehicle, the other fluid pipes and covering cabinetry being shown in phantom.
Figure 4B:
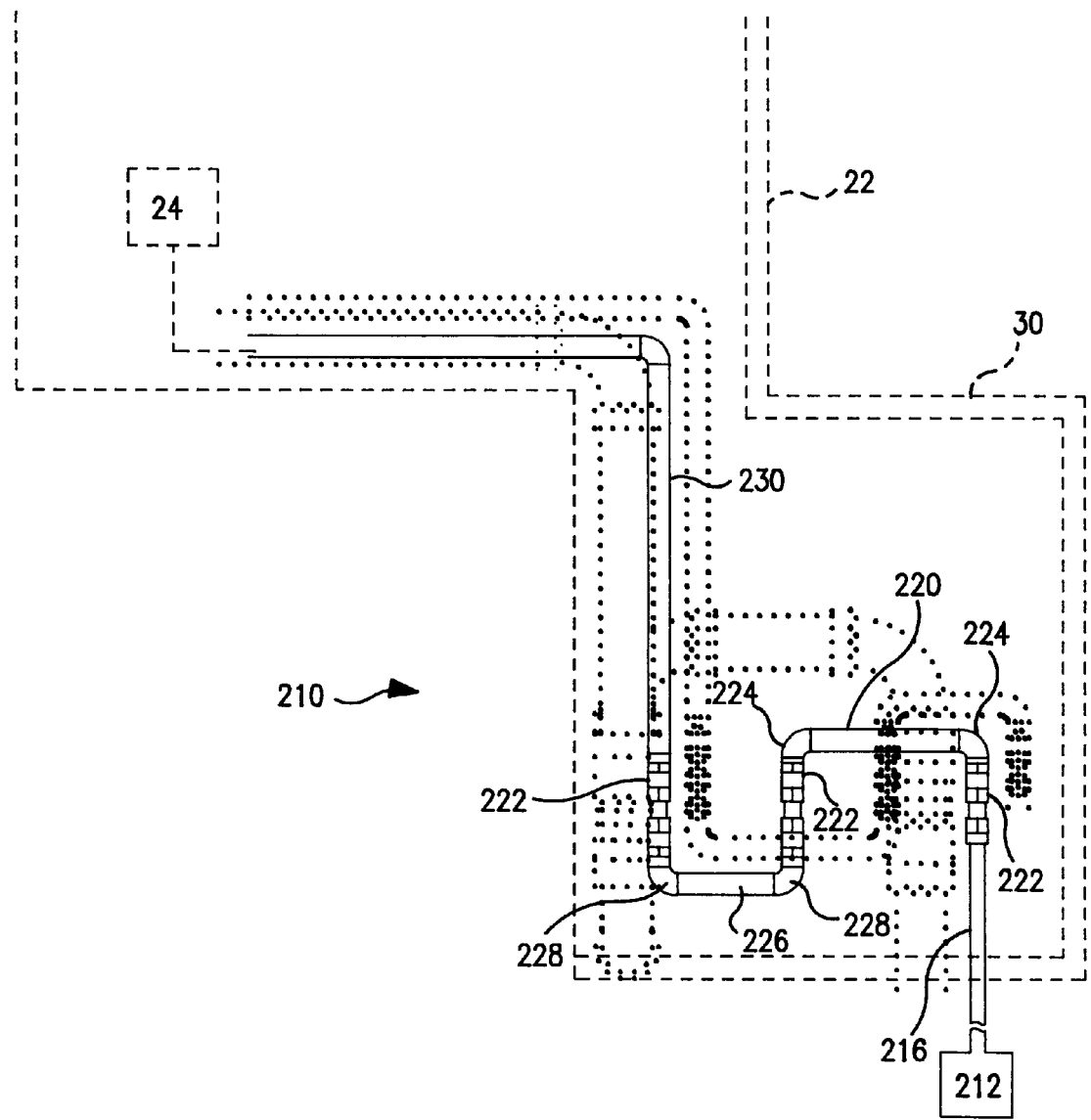
FIG. 4B shows a top schematic view of the hot water pipes of the slide out kitchen of FIG. 1 when completely extended from the vehicle, the other fluid pipes and covering cabinetry being shown in phantom.
Figure 5A:
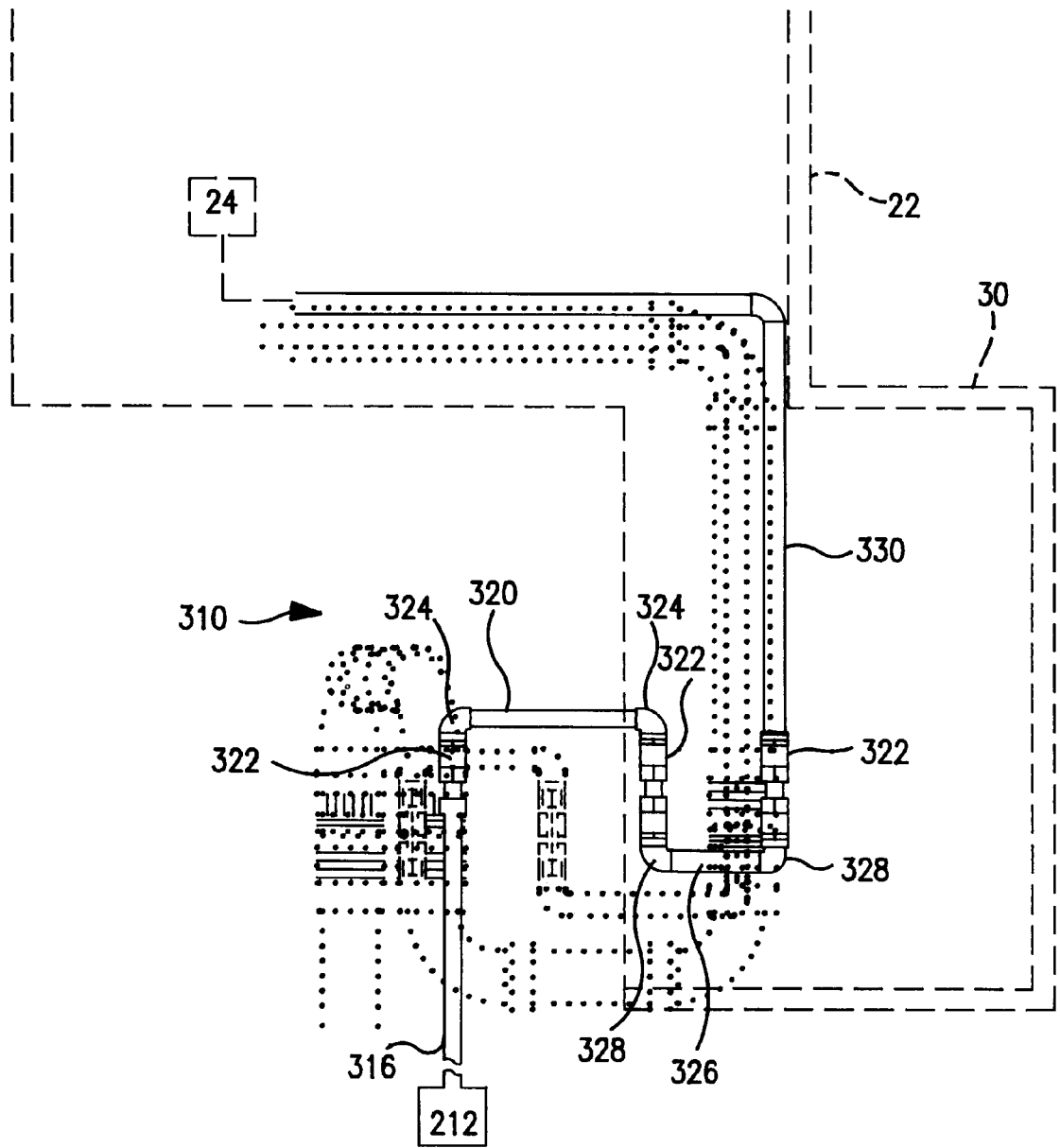
FIG. 5A shows a top schematic view of the cold water pipes of the slide out kitchen of FIG. 1 when fully retracted within the vehicle, the other fluid pipes and covering cabinetry being shown in phantom.
Figure 5B:
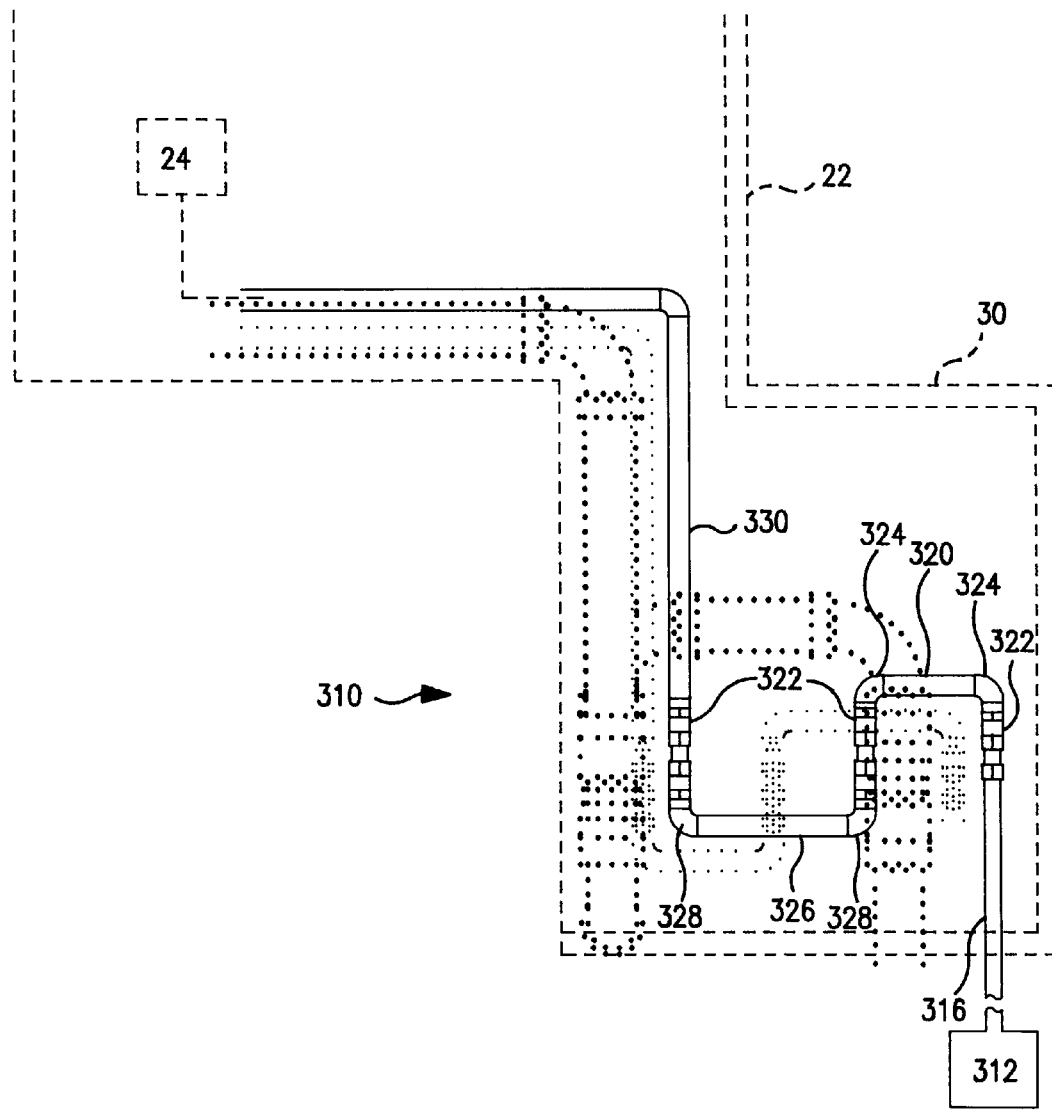
FIG. 5B shows a top schematic view of the cold water pipes of the slide out kitchen of FIG. 1 when completely extended from the vehicle, the other fluid pipes and covering cabinetry being shown in phantom.

The figures described above show preferred embodiments of the present invention as mounted in a typical vehicle 10, such as a Class A motor home or like motorized or towable recreational vehicle. As shown in FIG. 1, vehicle 10 includes a slide out portion 12 and a main outer wall 14. Slide out portion 12 includes a movable outer wall 16 which is substantially flush with main outer wall 14 when slide out portion 12 is in a fully retracted position and projects outwardly from main outer wall 14 when slide out portion 12 is in an extended position. In FIG. 1, an extended position is shown in which outer wall 16 extends a distance D from main outer wall 14.

Furniture 18 and fixture 20 are, for example, attached to the interior side of outer wall 16 such that they move with that wall when it is displaced. In this way, interior room space S is enlarged or contracted, depending upon if slide out portion 12 is extended or retracted. Various conventional structures are known which will permit such a slide out room arrangement.

However, the present invention permits fixture 20 to accommodate plumbing. Thus, fixture 20 may, for example, include kitchen cabinetry 22 with a faucet 24 for supplying fluid to one or more sinks 26 and one or more openings or drains 28 within each sink fluid collecting basin or 26 for removing waste fluid. In the embodiment shown, fixture 20 is fixedly connected to a pantry cabinet 30 which slides along interior wall 32 as outer wall 16 is moved relative to the main outer wall 14. Interior wall 32, on the other hand, is preferably fixed with respect to main outer wall 14.

In especially preferred embodiments of the present invention, cabinetry 22 is formed with cutouts 34 to receive faucet 24 and sinks 26, as well as any other desired features, such as a stove top 36. Vehicle 10 typically includes a conventional fluid supply of hot and/or cold water and a conventional waste fluid retainer, neither of which are located within slide out portion 12. Cabinetry 22 also includes spacial region P within and underneath it for housing the plumbing 100 between faucet 24 and that fluid supply and between sinks 26 and that waste fluid retainer.

Plumbing 100 includes, for example, three principle fluid flow lines formed with rigid pipe sections: drain line 110, hot water line 210 and cold water line 310. Drain line 110 receives fluid at a drain inlet 112 from drain 28 and transfers it to an outlet 114 leading to the waste fluid retainer or a conventional exterior vehicle opening. In especially preferred embodiments, drain line 110 includes a first pipe section 116 fixedly connected to drain 28 and including one or more bends 118 which lead the fluid at a downward or negative slope from cutout 34 to the underside of pantry cabinet 30. At its downstream end, first pipe section 116 is connected to second pipe section 120 via straight swivel joint 122. Second pipe section 120 preferably includes a plurality of bends 124 resulting in a 180 degree turn in the fluid flow path. At its downstream end, second pipe section 120 is connected to third pipe section 126 via another straight swivel joint 122. Third pipe section 126 preferably includes a plurality of bends 128 resulting in a 180 degree turn in the fluid flow path. At its downstream end, third pipe section 126 is connected to fourth pipe section 130 via another straight swivel joint 122. Fourth pipe section 130 leads to drain outlet 114 and is fixed to vehicle 10 such that slide out portion 12 moves relative to it.

Each of the pipe sections and bends in drain line 110 may be advantageously formed as a rigid member from ABS plastic material. Swivel joints 122 can employ conventional brass swivels such as Part No. 5509K72 Swivel from McMasters Corp. of Chicago, Ill.

With this arrangement, the length of pipe sections 120 and 126 is readily selected according to the distance traveled by slide out portion 12 and the height available under pantry cabinet 30 such that negative slopes are maintained in drain line 110 regardless of the positions of sink 26 when it is being used. In that regard, it may be desirable to position an elevational stop 140 under the second or third pipe section when slide out portion 12 is in extended positions. It is important that as the fluid flows from sink 26 to outlet 114 the slope of drain line 110 does not rise, or become elevated to a positive slope, when the sink is being used or else a waste fluid trap would be formed within drain line 110 which would retain the fluid therein. In achieving this, the swivel joints allow the pipe sections to rotate about the interpipe connections such that the pipes sections will, in effect, fold or pivot over each other. At the same time, these swivel joints can be sufficiently reliable as to minimize leakage over time in the vehicular environment.

Hot water line 210 is similarly constructed, although with an uphill fluid flow from an inlet fluid supply 212, such as a conventional hot water tank, to faucet 24. First pipe section 216 is fixedly connected to inlet fluid supply 212 at its upstream end. At its downstream end first pipe section 216 is connected with second pipe section 220 via straight swivel joint 222. Second pipe section 220 preferably includes a plurality of bends 224 resulting in a 180 degree turn in the fluid flow path. At its downstream end, second pipe section 220 is connected to third pipe section 226 via another straight swivel joint 222. Third pipe section 226 preferably includes a plurality of bends 228 resulting in a 180 degree turn in the fluid flow path. At its downstream end, third pipe section 226 is connected to fourth pipe section 230 via another straight swivel joint 222. Fourth pipe section 230 leads to faucet 24 and is fixed to slide out portion 12 so as to move with slide out portion and relative to vehicle 10.

Cold water line 310 is similarly constructed, although with an uphill fluid flow from an inlet fluid supply 312, such as a conventional water supply tank, to faucet 24. First pipe section 316 is fixedly connected to inlet fluid supply 312 at its upstream end. At its downstream end first pipe section 316 is connected with second pipe section 320 via straight swivel joint 322. Second pipe section 320 preferably includes a plurality of bends 324 resulting in a 180 degree turn in the fluid flow path. At its downstream end, second pipe section 320 is connected to third pipe section 326 via another straight swivel joint 322. Third pipe section 326 preferably includes a plurality of bends 328 resulting in a 180 degree turn in the fluid flow path. At its downstream end, third pipe section 326 is connected to fourth pipe section 330 via another straight swivel joint 322. Fourth pipe section 330 leads to faucet 24 and is fixed to slide out portion 12 so as to move with slide out portion and relative to vehicle 10.

Each of the pipe sections and bends in hot water line 210 and cold water line 310 may be advantageously formed as a rigid member from CPVC plastic material. Swivel joints 222 and 322 can employ conventional brass swivels such as Part No. 11990-17 Swivel conventionally available from Spraying Systems Co. of Wheaton, Ill. The length of the pipe sections is readily selected according to the distance traveled by slide out portion 12 and the available height under pantry cabinet 30.

Figure 6A:
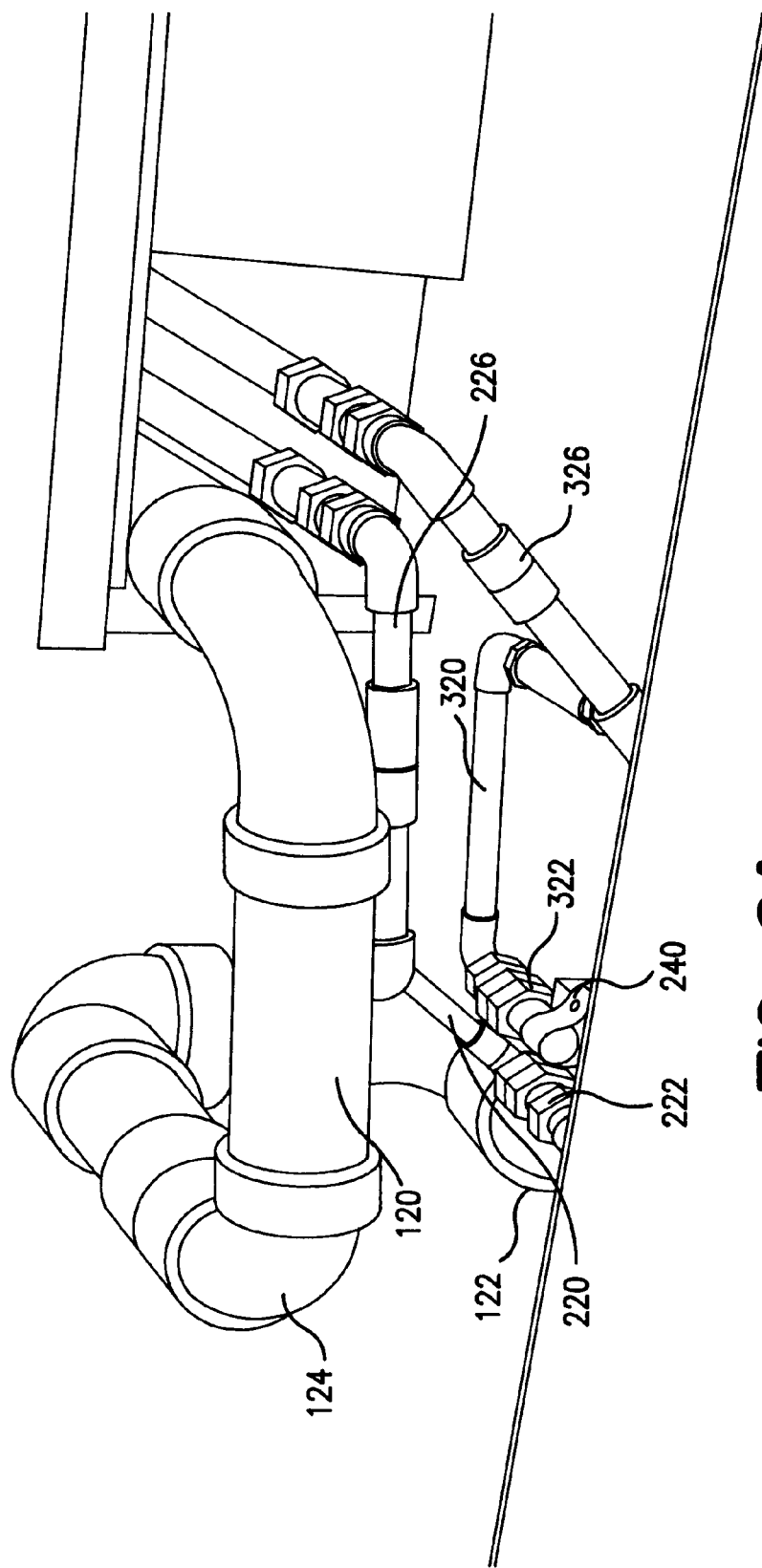
FIG. 6A shows an upper cutaway, left side perspective view of the fluid pipes of the slide out kitchen of FIG. 1 when fully retracted within the vehicle.
Figure 6B:
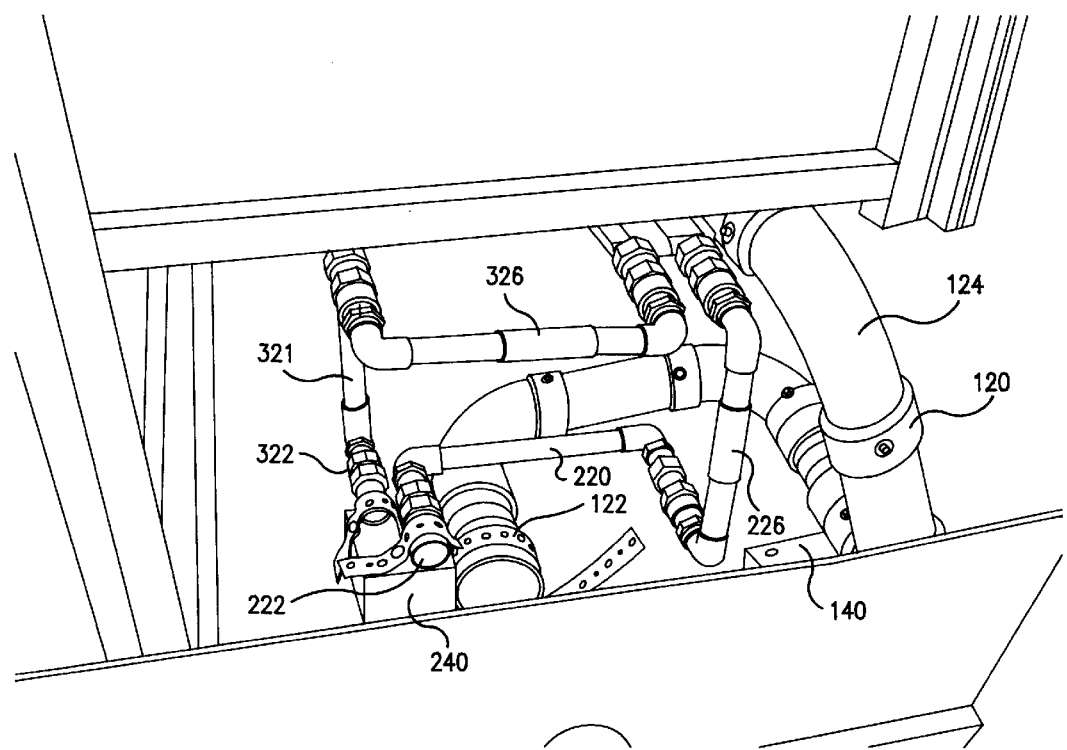
FIG. 6B shows an upper cutaway left side perspective view of the fluid pipes of the slide out kitchen of FIG. 1 when partially extended from the vehicle.

In order to minimize the spacial requirements of the plumbing arrangement of the present invention, the length of the pipe sections, locations of the swivel joints and elevations of the inlets and outlets may be adjusted relative to each other. For example, block 240 may be employed to raise the first and second pipe section connections in hot water line 210 and cold water line 310 above the thickness of third pipe section 126 and the pipe section dimensions of the water lines selected such that the folding of the water lines occurs within the space occupied by the folding of drain line 110. In doing so, to avoid interference between the water lines during folding, the location of the swivel joints can be offset such that the water lines, viewed in tandem, resemble a parallelogram linkage. The net result of this can be readily understood by a comparison of FIGS. 6A–C.

Although certain preferred embodiments of the present invention have been described above in detail, that is only by way of illustration and example. Those of ordinary skill in the art will now appreciate that modifications and adaptations of this invention can be made to many environments of use. Accordingly, the spirit and scope of the present invention are to be limited only by the terms of the claims below.

What is claimed is:

1. A plumbing assembly comprising:
   a fluid outlet,
   a fluid inlet mounted at a location that is movable with respect to the fluid outlet, and
   fluid conducting means connected between the fluid inlet and the fluid outlet for maintaining a non-positive slope and continuous connection therebetween regardless of the position of the fluid inlet.

2. The plumbing assembly according to claim 1 wherein the fluid outlet is adapted to be mounted to a first portion of a vehicle and the fluid inlet is adapted to be mounted to a second portion of the vehicle that is movable with respect to the first portion of the vehicle.

3. The plumbing assembly according to claim 1 wherein the fluid conducting means includes a plurality of rigid pipe sections that are sealingly connected so as to be rotatable with respect to each other.

4. The plumbing assembly according to claim 1 including three pivotable connections between four rigid lengths of pipe disposed such that the pipe orientation changes with the position of the fluid inlet but avoids creating an elevational rise toward the fluid outlet in any of the pipe lengths, regardless of the fluid inlet position.

5. A slide out kitchen adapted for a vehicle, comprising:
   a fluid outlet assembly fixedly mounted with respect to the vehicle,
   a kitchen cabinet section movably mounted with respect to the vehicle between at least two usage positions and including a sink basin, the sink basin having a drain opening therein, and
   a plumbing assembly connected between the drain opening and the fluid outlet assembly, the plumbing assembly providing means for transporting fluid from the sink basin to the fluid outlet assembly without creating an elevation in the path of the fluid which retains fluid intermediate the drain opening and the fluid outlet assembly, regardless of the usage position of the cabinet section with respect to the vehicle.

6. The kitchen assembly according to claim 5 also including at least one fluid supply assembly fixedly mounted with respect to the vehicle, a faucet mounted adjacent the sink basin for providing fluid thereto, and the plumbing assembly also including means for connecting the fluid supply assembly to the faucet so as to permit fluid flow therebetween.

7. The kitchen assembly according to claim 6 wherein the plumbing assembly is mounted in a behind the wall construction and the plumbing assembly is disposed such that the means for connecting the fluid supply assembly to the faucet and the means for transporting fluid from the sink basin to the fluid outlet assembly are confined to approximately the same spacial area.

8. A slide out kitchen, comprising:
   a fluid outlet;
   a sink mounted in a cabinet, that cabinet being slidable into a plurality of positions with respect to the fluid outlet;
   a fluid drain assembly connected between the fluid outlet and the sink, including:
      a first length of rigid pipe connected to the sink for receiving fluid therefrom;
      a second length of rigid pipe, pivotably connected to the first length of rigid pipe at a location intermediate any bends in either of those pipes, for receiving fluid therefrom;
      a third length of rigid pipe, pivotably connected to the second length of rigid pipe at a location intermediate any bends in either of those pipes, for receiving fluid therefrom; and
      a fourth length of rigid pipe, pivotably connected to the third length of rigid pipe and pivotably connected to the fluid outlet at a location intermediate any bends in either of those pipes.

9. The slide out kitchen according to claim 8, further comprising:
   first and second fluid supply inlets;
   at least one faucet mounted adjacent the sink for providing fluid to the sink;
   first supply pipe assembly connected between the first fluid supply inlet and the faucet;
   second supply pipe assembly connected between the second supply inlet and the faucet;
   the first and second supply pipe assemblies each being formed from a plurality of rigid pipe sections that are pivotably connected together and each such assembly is oriented with respect to the other assembly so as to form an offset parallelogram to decrease spacial displacement of the combined structure.

* * * * *